G. W. REDWINE.
HARROW ATTACHMENT FOR CULTIVATORS.
APPLICATION FILED APR. 16, 1913.
1,066,844.
Patented July 8, 1913.
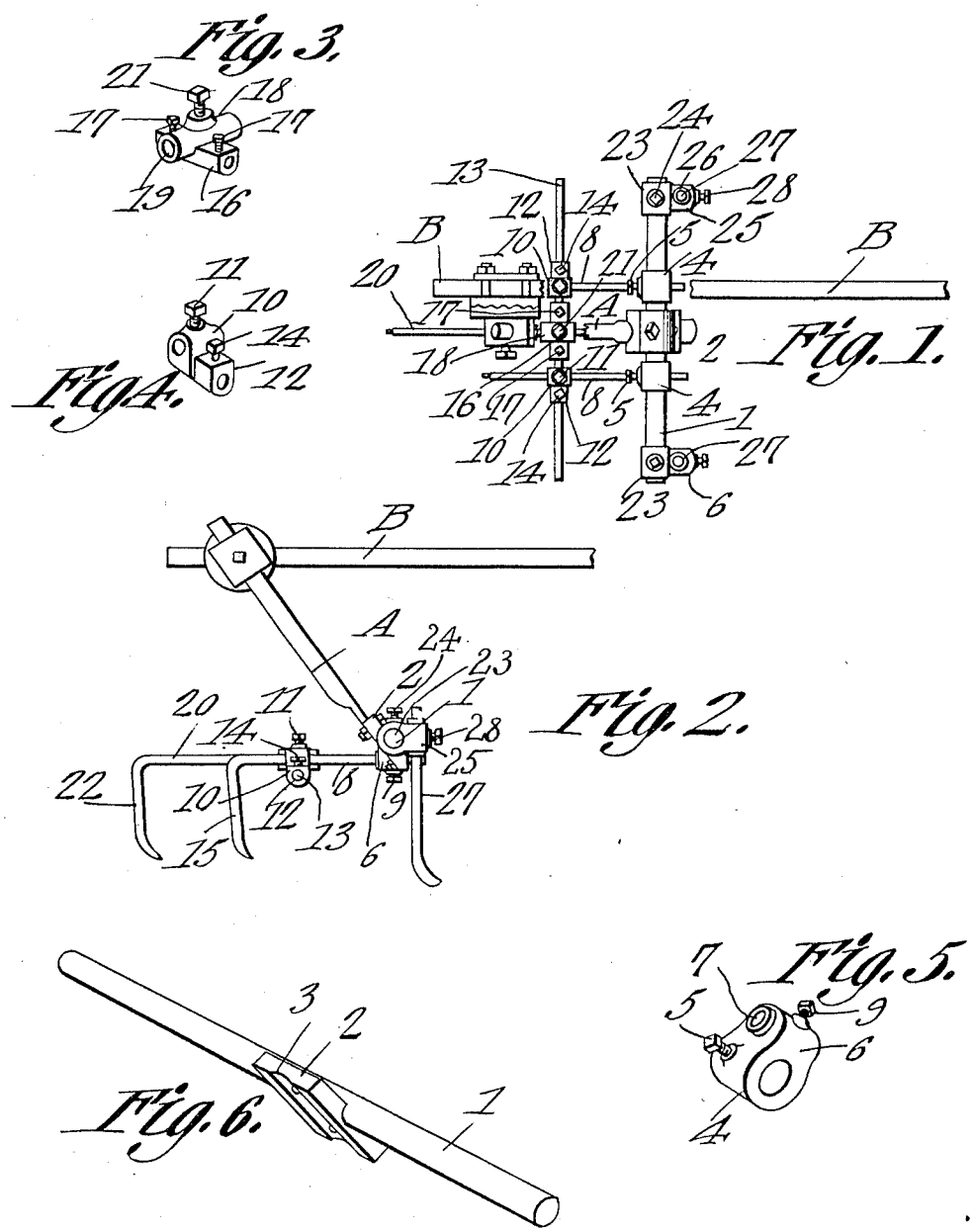
G. W. Redwine
Inventor
by C. A. Snow & Co.
Attorneys

UNITED STATES PATENT OFFICE.

GEORGE W. REDWINE, OF LESLEY, TEXAS.

HARROW ATTACHMENT FOR CULTIVATORS.

1,066,844.  Specification of Letters Patent.  Patented July 8, 1913.

Application filed April 16, 1913. Serial No. 761,536.

*To all whom it may concern:*

Be it known that I, GEORGE W. REDWINE, a citizen of the United States, residing at Lesley, in the county of Hall and State of Texas, have invented a new and useful Harrow Attachment for Cultivators, of which the following is a specification.

This invention relates to a harrow attachment for cultivators, one of its objects being to provide a simple, durable and efficient device of this character which can readily be placed in position upon a cultivator for the purpose of loosening the soil, particularly after it has become baked following a rain.

A further object is to provide a device of this character the soil engaging elements of which can be easily adjusted so as to dig to any depth desired.

A further object is to provide a harrow the soil engaging members of which are readily adjustable laterally relative to each other.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of a portion of a cultivator beam and showing the present improvements applied thereto. Fig. 2 is a side elevation of the structure shown in Fig. 1. Fig. 3 is a perspective view of one of the couplings. Fig. 4 is a perspective view of another form of coupling. Fig. 5 is a perspective view of a third form of coupling used. Fig. 6 is a perspective view of the front bar of the attachment.

Referring to the figures by characters of reference 1 designates the front cross bar of the attachment, the same being cylindrical and of any suitable length. This cross bar is provided at its center with an attaching plate 2 disposed at right angles to the bar and provided with a longitudinal recess 3 in its back face adapted to receive the standard A which is ordinarily provided for the shovel of a cultivator, this standard being secured in any desired manner to a cultivator beam B. When the plate 2 is bolted or otherwise fastened to the standard A, the bar 1 is obviously held against movement relative to the standard A.

Mounted on the bar 1 at each side of the plate 2 is a collar 4 adapted to be adjusted angularly and longitudinally upon the bar 1. Each collar has a set screw 5 or the like for engaging the bar 1 so as to hold the collar against movement after it has been adjusted. The collar is formed with an extension 6 in which is provided a bore 7. This bore is adapted to receive a rod 8 which extends rearwardly therefrom, the said rod being held against movement within the bore by a set screw 9 or the like. As hereinbefore stated, one of these collars 4 is located on the bar 1 at each side of plate 2. The two rods 8 extending rearwardly from the collars are also extended to couplings 10 and held within the couplings by set screws 11. Each coupling 10 has a sleeve 12 thereon through which extends a rear cross bar 13. This cross bar is held against movement within the two sleeves 12 by set screws 14. The rear ends of the rods 8 are bent downwardly to form teeth 15, the lower terminals of the teeth being flattened and preferably curved forward, as shown particularly in Fig. 2.

It will be obvious that, by loosening the set screws 5, collars 4 can be adjusted angularly so as to cause the rods 8 to extend rearwardly at any desired angle to the horizontal. Furthermore by loosening the set screws 5 and the set screws 14 the collars 4 and 12 can be shifted laterally along the bars 1 and 13 so as thus to bring the rods 8 any desired distances apart. By loosening the set screws 9 and 11, the rods 8 can be adjusted longitudinally within the coupling or the cross bar 13 can be adjusted toward or from the rod 1.

Mounted on the bar 13 between the collars 10 is a collar 16 preferably held against rotation upon the bar 13 by means of two set screws 17 which engage the bar 13. This collar 16 has an extension 18 within which is formed a bore 19. This extension 18 is adapted to receive a rod 20 extending rearwardly and which is parallel with the rods 8. A set screw 21 projects into the extension 18 and is adapted to engage rod 20 so as to hold it against movement relative to the extension. Said rod 20 has its rear end portion bent downwardly to form a tooth 22, the lower end portion of the tooth being preferably flattened and extended forwardly, as shown particularly in Fig. 2. Obviously, as bar 13 is held against rotation by the set screws 14, the collar 16 when fastened on said bar, will likewise be held against rotation. Secured upon the front bar 1 adjacent each end thereof is a collar 23 having a set screw 24 adapted to engage the bar 1 and thus hold the collar against rotation and also hold it against sliding movement on the bar 1. This collar 23 is similar to the collar 4 and has an extension 25 provided with a bore 26. The bores 26 are adapted to be arranged vertically and each of them is adapted to receive a rod 27, the lower end of which is curved slightly forward so as to form a tooth. Set screws 28 are provided for securing the rods 27 within the bores 26. Obviously by loosening the set screws, the rods 27 can be adjusted vertically.

By providing an attachment such as has been described, it will be seen that a five tooth harrow is produced, the rods 27 forming two of the teeth, the remaining teeth being provided at 15 and 22. The points of the teeth are preferably disposed along rearwardly diverging lines and it will be apparent that, by drawing the attachment forwardly between two rows, the soil will be loosened, the depth to which it is loosened being controlled by the vertical adjustment of the teeth 27 and by the angular adjustment of the rods 8 and 20. It will be noted, furthermore, that the teeth can be adjusted to any desired distances from the longitudinal center of the attachment and the area covered by the harrow can thus be varied at will.

By connecting one of these attachments to each of the standards of a cultivator, it will be seen that the harrows can be caused to travel along each of two rows and thus to loosen the soil, especially if baked, and permit the plants to sprout readily.

What is claimed is:—

1. An attachment for cultivators, including a front cross bar, means for securing the same to a standard, a rear cross bar, coupling devices upon said bars, rearwardly extending rods engaged by the coupling devices for holding the bars in predetermined positions relative to each other, teeth constituting integral portions of said rods and extending downwardly therefrom.

2. The combination with a front cross bar, and means for connecting the same to a standard, of collars adjustable angularly upon the bar and also adjustable longitudinally thereof, rearwardly extending rods adjustably connected to the collars, said rods terminating in downwardly extending soil engaging teeth, collars adjustably engaging the rods, a rear cross bar adjustably mounted in said collars.

3. The combination with a front cross bar, of collars mounted for longitudinal and angular adjustment thereon, means for connecting said bar to a standard, rods adjustably connected to said collars and extending rearwardly therefrom, said rods terminating in downwardly extending soil engaging teeth, collars adjustably mounted on the rods, a rear cross bar adjustably mounted within the last named collars, another collar adjustably mounted on the rear cross bar, a rearwardly extending rod adjustably mounted in the last named collar, said rod having its rear portion extended downwardly to form a soil engaging tooth.

4. The combination with a front cross bar, of collars mounted for longitudinal and angular adjustment thereon, means for connecting said bar to a standard, rods adjustably connected to said collars and extending rearwardly therefrom, said rods terminating in downwardly extending soil engaging teeth, collars adjustably mounted on the rods, a rear cross bar adjustably mounted within the last named collars, another collar adjustably mounted on the rear cross bar, a rearwardly extending rod adjustably mounted in the last named collar, said rod having its rear portion extended downwardly to form a soil engaging tooth, collars adjustably mounted upon the end portions of the front cross bar, and soil engaging teeth adjustably mounted in the respective collars at the ends of said bar.

In testimony that I claim the foregoing as my own, I have hereto affixed my signature in the presence of two witnesses.

GEORGE W. REDWINE.

Witnesses:
F. W. MELVIN,
REX C. ORTELACO.

---

Copies of this patent may be obtained for five cents each, by addressing the "Commissioner of Patents, Washington, D. C."